US006955268B2

(12) United States Patent
Waldron

(10) Patent No.: US 6,955,268 B2
(45) Date of Patent: Oct. 18, 2005

(54) MERCHANDISE DISPLAY

(75) Inventor: Merle M. Waldron, Maple Grove, MN (US)

(73) Assignee: Exotic Rubber and Plastics of Minnesota, Inc., Plymouth, MN (US)

( * ) Notice: Subject to any disclaimer, the term of this patent is extended or adjusted under 35 U.S.C. 154(b) by 0 days.

(21) Appl. No.: 10/686,888

(22) Filed: Oct. 15, 2003

(65) Prior Publication Data

US 2004/0140276 A1 Jul. 22, 2004

Related U.S. Application Data

(63) Continuation of application No. 09/957,692, filed on Sep. 20, 2001, now abandoned.
(60) Provisional application No. 60/234,068, filed on Sep. 20, 2000.

(51) Int. Cl.[7] .............................. B42F 1/00; A47G 29/00
(52) U.S. Cl. .............................. 211/51; 211/52; 211/55; 211/59.3; 211/194; 211/40
(58) Field of Search ....................... 211/40, 49.1, 50–52, 211/55, 59.2–59.3, 72–73, 126.5, 126.16, 128.1, 130.1, 132.1, 194; 206/730–731, 735, 738, 740, 743, 745–746, 756–757, 759–761, 766, 772, 773, 504, 509; 312/9.9, 9.47, 9.53, 9.57

(56) References Cited

U.S. PATENT DOCUMENTS

| 101,130 | A | * | 3/1870 | Hockett | 312/190 |
|---|---|---|---|---|---|
| RE14,279 | E | * | 4/1917 | Back | 211/51 |
| 1,240,105 | A | * | 9/1917 | Townsend | 211/52 |
| 1,632,504 | A | * | 6/1927 | Preston | 40/653 |
| 2,532,600 | A | * | 12/1950 | Broersma | 211/55 |
| 2,732,952 | A | * | 1/1956 | Skelton | 211/59.3 |
| 3,083,067 | A | * | 3/1963 | Vos et al. | 312/71 |

(Continued)

Primary Examiner—Carl D. Friedman
Assistant Examiner—Jennifer E. Novosad
(74) Attorney, Agent, or Firm—Patterson, Thuente, Skaar & Christensen, P.A.

(57) ABSTRACT

A modular display system for polyhedron shaped merchandise, such as DVD's, software, computer games, CD's and the like, and a method for manufacturing such a display. In a preferred embodiment, the system comprises a plurality of individual pocket constraints configured as integral modules aligned and retained in a set of cascading shelves. The individual pocket modules are an integral form having side constraints, a connecting portion extending between the side portions, and a pushing portion having a merchandise engagement portion connecting to a bias-providing portion. The cascading shelves are, in a preferred embodiment, formed from a plurality of stackable shelves. Each shelf, in a preferred embodiment, has a horizontal lower base, a vertical back side, a vertical front portion, and a horizontal top piece forming generally a G-shape in the cross-section. The shelves are cascaded such that each successive higher shelf is set rearwardly from the shelf below.

17 Claims, 5 Drawing Sheets

U.S. PATENT DOCUMENTS

| | | | | |
|---|---|---|---|---|
| 3,207,321 A | * | 9/1965 | Joyce | 211/126.5 |
| 3,357,597 A | * | 12/1967 | Groff | 221/279 |
| 3,581,906 A | * | 6/1971 | Joyce | 211/126.5 |
| 3,606,949 A | * | 9/1971 | Joyce | 211/126.5 |
| 3,995,921 A | * | 12/1976 | Ackeret | 312/9.23 |
| 4,213,559 A | * | 7/1980 | Meyers | 229/117.18 |
| 4,312,548 A | * | 1/1982 | Posso | 312/9.52 |
| 4,454,949 A | * | 6/1984 | Flum | 211/59.2 |
| 4,479,583 A | * | 10/1984 | Franklin et al. | 211/59.2 |
| 4,540,222 A | * | 9/1985 | Burrell | 312/257.1 |
| 4,588,093 A | * | 5/1986 | Field | 211/51 |
| 4,613,047 A | * | 9/1986 | Bushyhead et al. | 211/55 |
| 4,630,737 A | * | 12/1986 | King | 211/40 |
| 4,706,821 A | * | 11/1987 | Kohls et al. | 211/59.3 |
| 4,815,795 A | * | 3/1989 | Accumanno et al. | 312/9.46 |
| 4,838,436 A | * | 6/1989 | Bailey | 211/51 |
| 4,905,845 A | * | 3/1990 | Broeker et al. | 211/55 |
| 4,938,366 A | * | 7/1990 | Carroll | 211/55 |
| 5,040,688 A | * | 8/1991 | Martin et al. | 211/55 |
| 5,148,925 A | * | 9/1992 | Althoff et al. | 211/40 |
| 5,295,592 A | * | 3/1994 | Thorne | 211/59.2 |
| 5,485,928 A | * | 1/1996 | Felton | 211/52 |
| 5,505,315 A | * | 4/1996 | Carroll | 211/59.2 |
| 5,547,086 A | * | 8/1996 | Chen | 211/40 |
| 5,562,217 A | * | 10/1996 | Salveson et al. | 211/59.3 |
| 5,665,304 A | * | 9/1997 | Heinen et al. | 312/71 |
| 5,697,505 A | * | 12/1997 | Sprague | 211/13.1 |
| 5,871,108 A | * | 2/1999 | White | 211/186 |
| 5,906,283 A | * | 5/1999 | Kump et al. | 211/54.1 |
| 5,988,407 A | * | 11/1999 | Battaglia | 211/51 |
| 6,003,687 A | * | 12/1999 | Wyatt | 211/40 |
| 6,006,927 A | * | 12/1999 | Levy | 211/51 |
| 6,015,051 A | * | 1/2000 | Battaglia | 211/59.3 |
| 6,082,558 A | * | 7/2000 | Battaglia | 211/59.3 |
| 6,105,796 A | * | 8/2000 | Buchanan et al. | 211/128.1 |
| 6,112,912 A | * | 9/2000 | Lord et al. | 211/55 |
| 6,412,648 B1 | * | 7/2002 | Woolnough et al. | 211/128.1 |
| 6,651,827 B1 | * | 11/2003 | Eberwein et al. | 211/50 |
| 6,820,753 B2 | * | 11/2004 | Kurtz et al. | 211/53 |
| 2003/0106867 A1 | * | 6/2003 | Caterinacci | 211/40 |

* cited by examiner

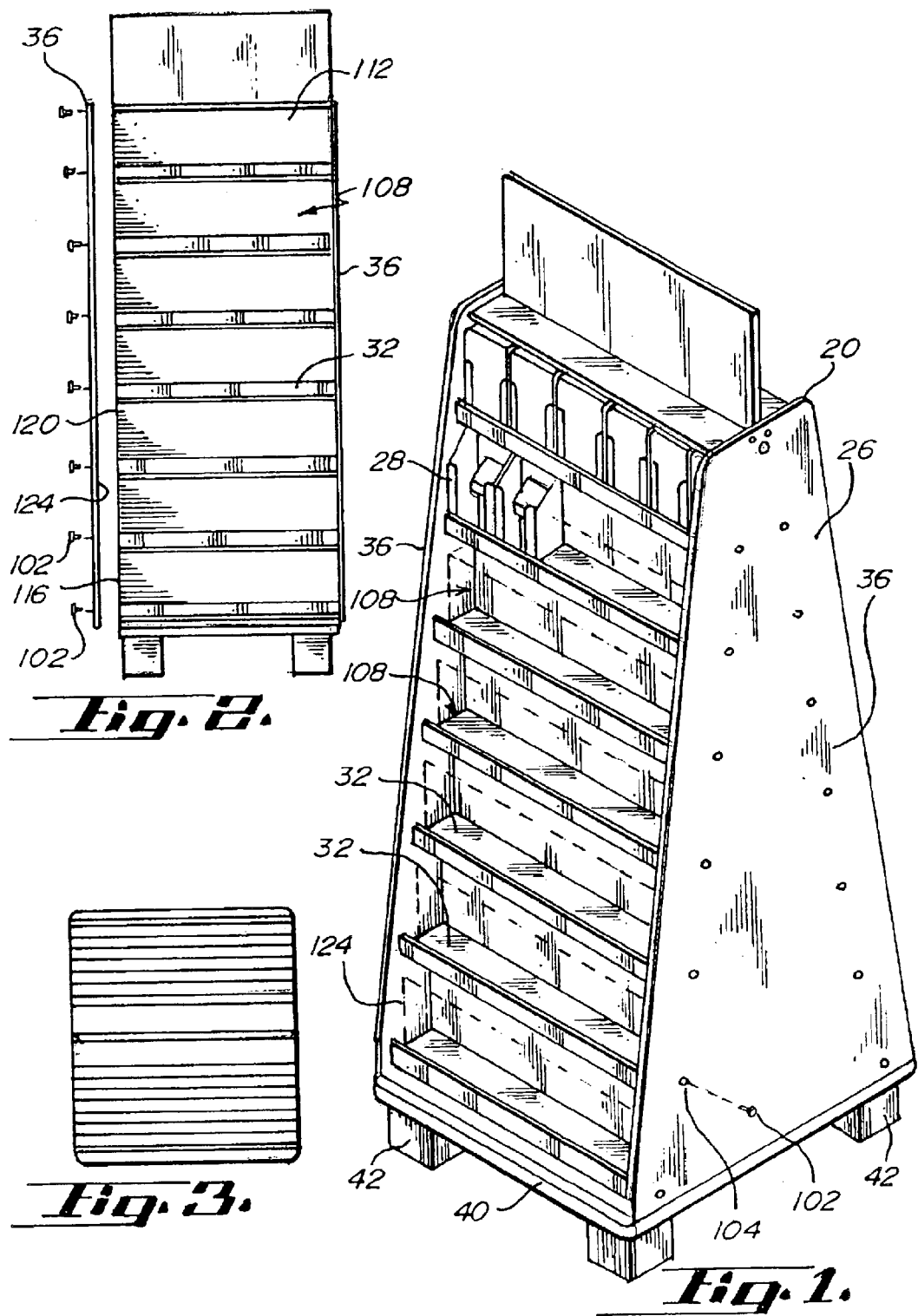

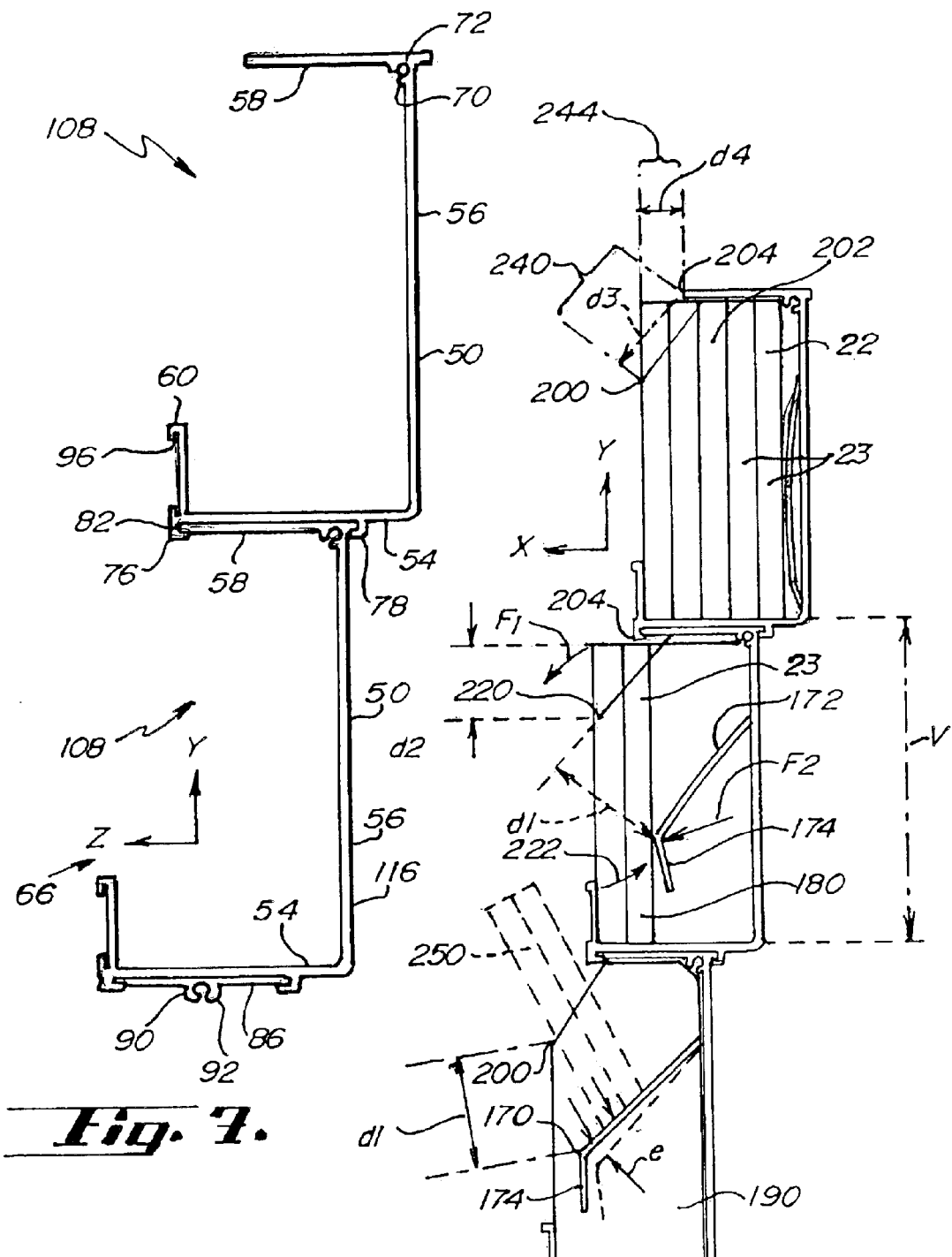

MERCHANDISE DISPLAY

This application claims priority to patent application Ser. No. 09/957,692 filed on Sep. 20, 2001, now abandoned which claimed priority to Provisional Application No. 60/234,068 filed Sep. 20, 2000, and incorporates the entire disclosure of said applications herein by reference.

BACKGROUND OF THE INVENTION

This invention relates to displays, more particularly the invention relates to merchandise displays with pusher mechanisms for retail display of packaged merchandise such as DVD's.

Various means have been utilized for displaying DVD's, cassette tapes, CD's and the like. These are typically shelves with adjustable dividers or open bins viewable from the front. These are not ideal in that they are expensive to construct, do not provide optimal viewing of the product, do not ideally "front" the product, and do not generally present a highly attractive display.

Typically these products allow a significant quantity of the fronted items to be simultaneously removed from the merchandise display. This presents a loss control issue in that thieves are known to quickly grab a great quantity of DVD's or CD's and then run out of the store. To the extent that quantities of such merchandise cannot be quickly grabbed, the significant loss of these larger quantities can be controlled.

The known displays that provide a fronting feature generally require a rather complex mechanism for pushing the items forward to the front of the display or utilize separate removable pusher components which can be misplaced and can increase manufacturing costs. These displays are not particularly aesthetically appealing particularly when the display is empty. Some display systems utilize gravity which typically does not efficiently utilize the display case area and does not reliably front the product.

A display for boxed merchandise items is needed that is relatively easy and inexpensive to fabricate, that is effective in preventing thefts of significant quantities of product, that is effective in fronting the product, and that is aesthetically attractive.

SUMMARY OF THE INVENTION

A modular display system for polyhedron shaped merchandise, such as DVD's, software, computer games, CD's and the like, and a method for manufacturing such a display, is relatively inexpensive to fabricate and presents a highly attractive and functional display. In a preferred embodiment, the system comprises a plurality of individual pocket constraints configured as integral modules aligned and retained in a set of cascading shelves. The individual pocket modules are an integral form having side constraints, a connecting portion extending between the side portions, and a pushing portion having a merchandise engagement portion connecting to a bias-providing portion. The cascading shelves are, in a preferred embodiment, formed from a plurality of stackable interlocking shelves. Each shelf, in a preferred embodiment, has a horizontal lower base, a vertical back side, a vertical front portion, and a horizontal top piece forming generally a G-shape in the cross-section. In an embodiment, the pocket modules and shelves provide a constrained zone of removal that effectively limits the number of items that can be removed at one time while still allowing substantially full frontal view of the product.

A feature and advantage of particular embodiments of the invention is that the shelves may be formed from plastic by extrusion and the extruded shelves assemble, stack, and lock together in a cascade arrangement. This provides great economy and ease in manufacturing of a highly functional and effective display.

A feature and advantage of particular embodiments of the invention is that a zone of removal of product pieces is constrained by the shelves and pocket modules in cooperation limiting the number of items that can be removed and requiring a certain level of dexterity. In preferred embodiments this is one or two items at a time. Insertion and loading of the pocket modules, in contrast, is relatively easy and generally the number of product pieces that can be inserted at one time is greater than the number product pieces that can be removed at one time.

A feature and advantage of particular embodiments of the invention is that the pocket module may be formed from a die cut sheet of transparent plastic, preferably PETG, that is bent by way of heating for defining the portions and form of the module. This provides an attractive module with the appropriate constraining portions and fronting portion in an integral module.

A feature and advantage of particular embodiments of the invention is that the modules may be arrangeable in any desired matrix by providing shelves of a desired particular length and stacked in a desired quantity.

A feature and advantage of particular embodiments of the invention is that the pocket module may be configured of any desired size for display of different product.

A feature and advantage of particular embodiments of the shelf is that the horizontal lower base may have a downwardly facing horizontal slot to receive the horizontal top piece of a shelf immediately therebelow.

A feature and advantage of particular embodiments of the invention is that displays may me easily constructed of minimal principal components; namely a base plate, a plurality of shelves, a plurality of pocket modules, and side panels. Various size components may be retained for subsequent assembly and certain components will universally fit the variable sized components. For example, the side panels will generally work with any length shelves.

A feature and advantage of particular embodiments of the invention is that it can be retrofitted into existing steel shelf gondolas. For example, pocket modules can be fixed to existing shelves to provide many of the features described herein.

A feature and advantage of particular embodiments of the invention is that the extruded shelves may have a screw receiving portion, a slot for the horizontal top portion of a shelf to be positioned therebelow, and a label slot all defined by integral structure. This provides for easy stacking assembly and utilization of a minimal number of fasteners, such as screws.

A feature and advantage of particular embodiments of the pocket module is that the module can be utilized in isolation as a self-standing product dispenser/display.

A feature and advantage of particular embodiments of the pocket module is that the pusher provides an ideal forward pushing force that effectively fronts product, that retracts relatively easily for further stocking, that is mechanically simple and extremely robust, that is essentially maintenance free, and that has an extremely long useful life.

Another feature and advantage of particular embodiments of the invention is a pocket module that the configuration of the pusher portion inhibits or prevents the forward tilt of product pieces in the receiving zone. This inhibits removal of more than one or two items. This is advantageous particularly when the pocket volume is not fully loaded.

A feature and advantage of particular embodiments of the invention is that the lower base, the back side, the front wall, the top, may all be integral with one another. This provides for ease of manufacture and also provides for ease of assembly and cleaning if necessary.

DESCRIPTION OF THE FIGURES

FIG. 1 is a perspective view of a merchandise display according to the invention.

FIG. 2 is a front elevational view of the display of FIG. 1.

FIG. 3 is a plan view of the display of FIG. 1

FIG. 7 is an end view of plastic extrusions for shelves in accordance with the invention.

FIG. 8 is an end view of a flange.

FIG. 9 is a side elevational view of shelves with pocket modules mounted therein in various states of loading in accordance with the invention herein.

DETAILED DESCRIPTIONS OF PREFERRED EMBODIMENTS

Figure 4:
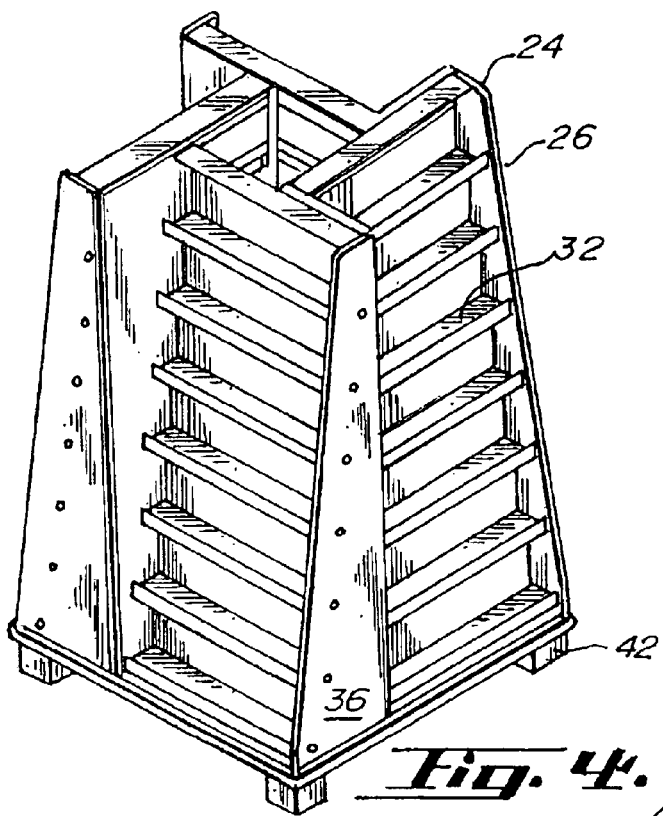
FIG. 4 is a perspective view of an alternative embodiment of the invention.
Figure 5:
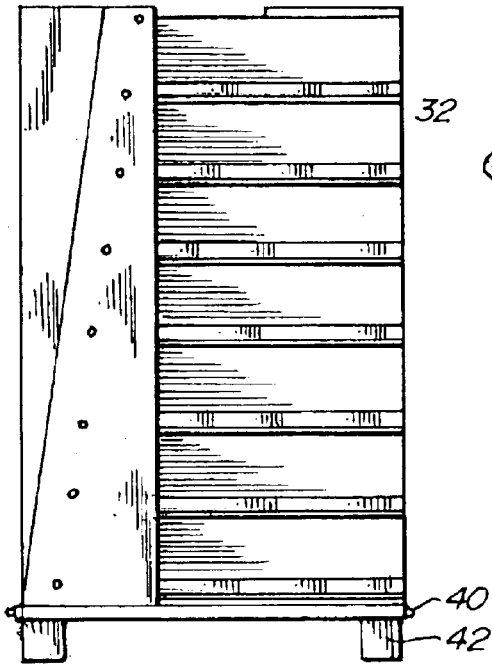
FIG. 5 is elevational view of the display of FIG. 4.
Figure 6:
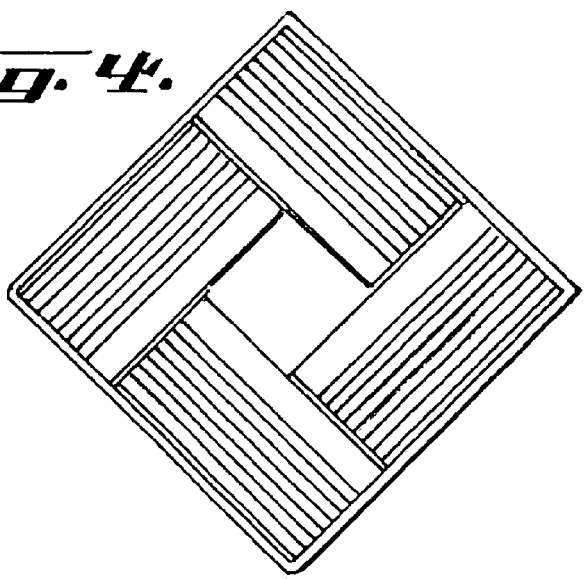
FIG. 6 is a plan view of the display of FIG. 4.

FIGS. 1–5 illustrate two configurations of merchandise displays 20, 24 in accordance with the invention for holding groupings 22 of individual uniform sized product pieces 23. These embodiments principally comprise a display rack 26 and pocket modules 28 retained therein. The display rack is comprised of a plurality of supports, configured as shelves 32, end panels 36, a base 40 and feet 42.

Referring to FIGS. 7, 8 and 9, details of the shelves are illustrated. FIG. 7 in particular shows two shelves 50 which are assembled together in a cascading fashion as illustrated in FIGS. 1 and 4. The upper shelf is offset slightly backward from the lower shelf. These shelves each are comprised of an integral base portion 54, an integral back side portion 56, an integral top portion 58, and an integral front portion 60. The shelves as illustrated are preferably formed of a plastic extrusion. Adjacent to the top portion and back side portion is a boss (70) defining an aperture 72 configured as a screw hole. Additional structure configure as bosses 76, 78 are positioned on the base portion 54 of the shelf defining a slot 82. The slot is sized for receiving the top portion 58 of an adjacent shelf. Flange 86 which may also be an extrusion is also sized to be a sliding fit within the slot 82. The flange has a boss 90 with an aperture configured as a screw hole 92. Additionally, the front portion of each shelf is configured to a slot 96 for receiving a label or decorative insert.

An ideal material for the shelves is styrene with a wall thickness of approximately 0.125 inches. A suitable range for the wall thickness of the shelves is believed to be 0.075 to 0.250 inches.

The shelves 56 are fixed intermediate the end panels and secured in place by way of fastener portions configured as screws 102 extending through apertures 104 in the end panels. Each shelf has a pocket module-receiving region 108 generally defined by the base portion, back side portion and front portion.

Referring to FIGS. 2 and 7, the end panel 36 is secured to the stack of shelves 112 by way of a plurality of screws 102 that attach to the fastening portions 70 of the cascaded interconnected shelves as well as the screw hole 92 in the bottom flange 86 inserted in the slot of the lower most shelf. Each shelf can be seen to be generally G-shaped in the cross section and has a end face 116 that is generally planar and with the shelves stacked all of the end faces of each of the stacked shelves form an overall planar surface 120 which confronts and engages the inside surface 124 of the end panel 36 providing a very secure structure.

Figure 11:
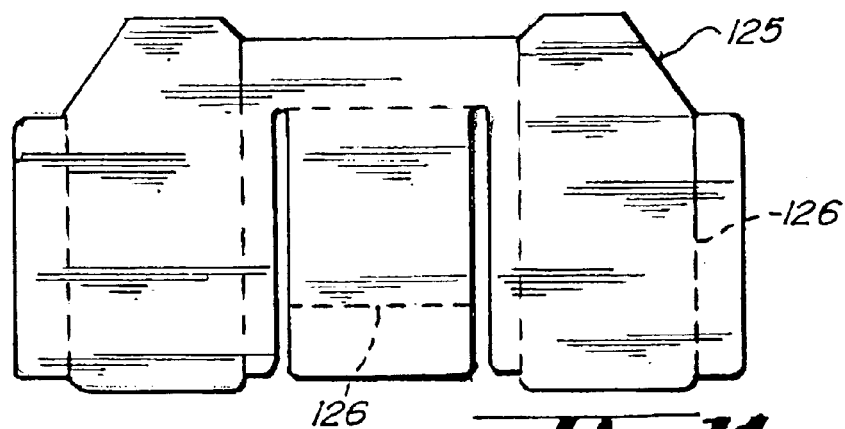
FIG. 11 is a plan view of a cutout of a sheet of plastic prior to bending for forming the pocket module of FIG. 10.
Figure 10:
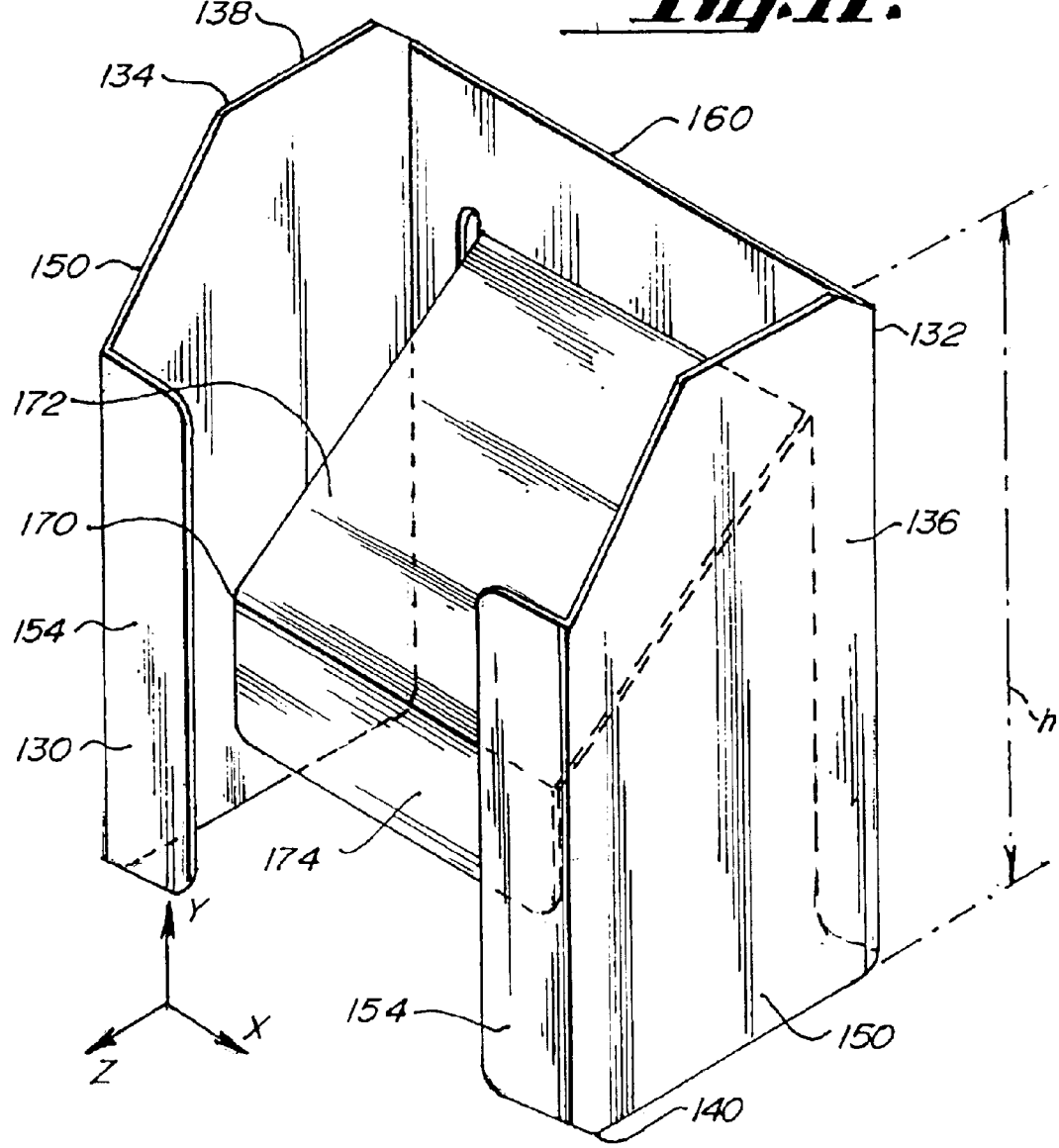
FIG. 10 is an embodiment of a pocket module in accordance with the invention.
Figure 13:
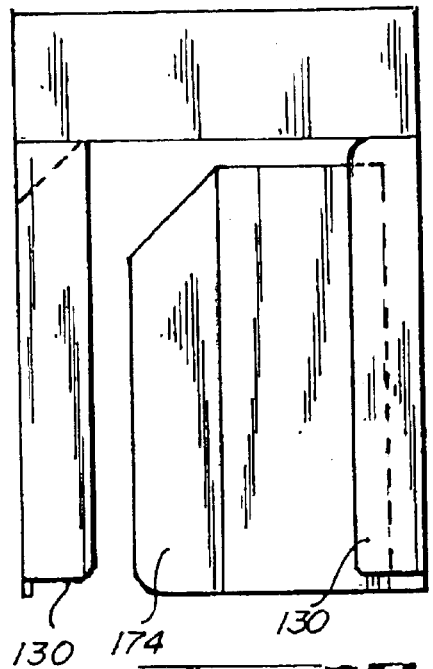
FIG. 13 is a front elevational view of the pocket module of FIG. 12.
Figure 14:
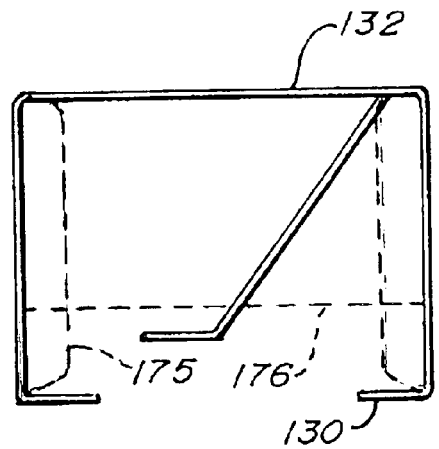
FIG. 14 is a top plan view of the pocket module of FIG. 12.
Figure 12:
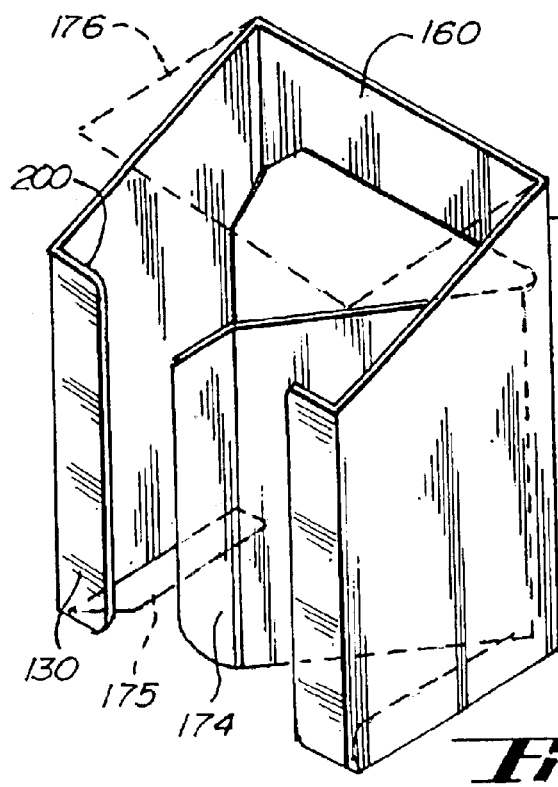
FIG. 12 is a further embodiment of a pocket module in accordance with the invention.

Referring to FIGS. 10, 11, 12, 13, and 14, various views of two different embodiments of pocket modules are illustrated. FIG. 11 illustrates a cut-out portion 125 of a flat resilient sheet material, such as PETG (polyethyleneterephthalate glycol), that is bent along the fold lines 126 under heat to form the module as illustrated in FIGS. 10 and 12.

Each pocket module has a front side 130, a back side 132, a left side 134, a right side 136, a top side 138, and a bottom side 140. A pair of sidewall portions 150 are positioned at the left side and right side of the pocket module. A pair of front wall portions 154 are connected and integral with the side wall portions and are positioned at the front side. A portion 160 extends between the sidewall portions. In the embodiments of FIGS. 10 and 12 this portion extending between the sidewalls also comprises a back wall portion positioned at the back side. A pusher portion 170 comprising a spring portion 172 and an engagement portion 174 is integral with and extends from the back side at the back wall portion. In certain embodiments, additional portions may be added such a bottom wall portions 175, and a top wall portion 176 indicated by dot-dash lines on FIGS. 12 and 14. In these embodiments, the appropriate sections to bent are added to the pattern, such as illustrated in FIG. 11.

A suitable plastic for the pocket constraints is PETG (polyethyleneterephthalate glycol modified) preferably formed from sheets approximately 0.060 inches thick. An appropriate range for providing the necessary structural rigidity while still allowing easy folding and providing the appropriate bias on the pusher portion is believed to be in the range of 0.020 to 0.200 inches.

Referring to FIG. 9 the pocket modules positioned in a set of stacked shelves is illustrated in various loading levels. In the lower most shelf of FIG. 9 the pusher portion 170 is located in its natural unstressed position. In such a position both the engagement portion 174 and the spring portion 172 are generally planar. It should be noted that other non-planar configurations may also be suitable and are included in certain embodiments of the invention claimed herein. The pocket module generally has a pocket volume 190 which is a receiving region for the groupings 22 of merchandise 22. The merchandise is comprised of the individual product pieces 23. The middle shelf of FIG. 9 illustrates a pocket volume with two product pieces positioned therein and the pusher portion displaced from its original position such as that shown in the lower most shelf. In this position a forward bias is provided by the engagement portion 174 on the back most piece 180 of the merchandise. The merchandise is configured in a backwardly extending aligned grouping 202 which is comprised of one or several product pieces. The upper most shelf of FIG. 9 has a pocket module fully loaded to capacity with the pusher portion deflected generally to its maximum deflection point. In this particular position the bias is provided by the bending of the pusher portion as well as some stressing and deformation of the back wall portion.

Note that the vertical height h of the pocket module is substantially equal to the vertical spacing v between the base portion of adjacent stacked shelves.

The various components assembled as illustrated in FIGS. 2, 7, and 9, may be secured together by the use of suitable plastic adhesives. Or if disassembly is desirable the use of mechanical fasteners is sufficient to secure the display stands together.

Referring to FIG. 9, the pocket modules in various states of loading illustrate the functionality of this embodiment of the invention. The front wall portions 130 of the pocket modules require that removal of the product pieces is upward above the top edge 200 of the front wall portion. The top edge 200 and the front edge 204 of the top portion 58 of the shelf define a zone of removal 210. The design of the pocket modules requires the product pieces to be extracted substantially in a vertical direction. The positioning of the pusher portion and the relatively high positioning of the top edge 200 of the front wall portions 130 resists or precludes forward tipping of the product pieces seated in the pocket module and thus, in the embodiment illustrating precludes removal of more than one. Forward tipping can only occur by manual force $F_1$ about the pivot point 220 defined by the top edge 200. This is resisted by force $F_2$ provided by the pusher portion. The resistance of forward tipping provided by the pusher portion is enhanced by distance $d_1$ of the engagement portion from the pivot point 220, ideally 1.5 time or more the distance $d_2$. Moreover, the displacement of the pusher portion in the direction of the pusher portion indicated by the arrow 222, which is necessary for forward tipping of the product, is resisted by compression of the spring portion, as compared to a simple deflection e when product is loaded as illustrated in the bottom most shelf.

Referring to the uppermost shelf of FIG. 9, a zone of access 240 to the pocket is defined as the minimal distance $d_3$ of the opening between the top edge 200 of the first wall portions and the front edge of the top wall portion 58. Product pieces can be inserted into the pocket in this range although they can be removed only out of the zone of removal 244 defined substantially by the horizontal distance $d_4$ between front edge 204 of the top wall portion and the front wall portions 140. As illustrated in the lower most shelf, a grouping 250 of at least 2 product pieces can be inserted into the zone insertion whereas illustrated in the uppermost shelf, only one product piece can be removed.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. When used herein "substantially" includes exactly.

I claim:

1. A display rack for holding a matrixical arrangement of groupings of polyhedron shaped products and for minimizing simultaneous removal of multiple of polyhedron shaped products in combination with a plurality of the polyhedron shaped products, the polyhedron shaped products having a thickness and a height, the rack comprising: a plurality of vertically stacked shelves, each shelf sized for receiving a row of pocket modules thereon, each shelf that is above a lower shelf offset rearwardly from said lower shelf; a plurality of pocket modules positioned on the shelves in a matrixical arrangement, each individual pocket module formed of a single piece of clear plastic sheet material and having two sidewall portions, a front portion, and a back pusher portion, all integral with one another wherein each portion connected to another portion is connected at a fold formed in the single piece of clear plastic sheet each of said portions having a uniform thickness and the sidewall portions and the front portion defining a pocket for receiving therein one of the groupings of products, the pusher portion having a spring portion that when deflected rearwardly by the product grouping in said pocket provides a forward bias acting on said grouping; a plurality of the polyhedron shaped products arranged in grouping in a plurality of the pocket modules, each grouping having a forwardlimost product; and the pocket modules and vertically stacked shelves arranged such that only the forwardlimost product in each grouping can be raised and removed vertically from each respective pocket.

2. The combination of claim 1, wherein the shelves are formed from a plurality of G-shaped extrusions and each shelf comprises a horizontally extending integral top wall portion, an integral back side wall portion, an integral base wall portion, and an integral front wall portion, and a pair of integral bosses extending from the base wall portion, the pair of integral bosses defining a horizontal slot open downwardly, the slot sized to fit and engage with the top wall portion of a G-shaped extrusion immediately therebelow.

3. The combination of claim 2, further comprising at least one side panel, and wherein each G-shaped extrusion comprises at least one fastener portion, and wherein the at least one side panel is positioned upright adjacent to the vertically stacked shelves and the display rack further comprises a plurality of fasteners attaching the panel to the stack of upright shelves.

4. The combination of claim 3, wherein at least one of the bosses is configured as a screw opening, wherein the at least one side panel has a plurality of holes, wherein the fasteners comprise a plurality of screws, wherein the at least one fastener portion has a screw hole, and wherein the side panel is attached to the vertically stacked shelves by way of the screws extending through the side panel into the screw hole.

5. The combination of claim 1, wherein all portions of each pocket module are formed of a sheet of PETG with a thickness in the range of 0.020 to 0.200 inches.

6. The combination of claim 1, wherein the shelves have a vertical spacing therebetween, and the height of the product is less than the vertical spacing.

7. The combination of claim 1, wherein each pocket module and each grouping of polyhedron shaped products has a frontal surface area, and whereby at least 80% of the frontal surface area of each grouping is visible from the front of the display.

8. The combination of claim 1, wherein each pocket module has an integral front wall at the front side of each of said pocket module and wherein said front wall constrains a removal zone through which each of said polyhedron shaped products can be inserted and removed only in a substantially vertical direction from said pocket module and wherein the pocket module has a most forward position and wherein only the polyhedron shaped product in the most forward position can be removed.

9. A display in combination with a backwardly extending aligned grouping of a plurality of like shaped products, the display comprising a plastic pocket module having a front side, a back side, a left side, a right side, a top, and a bottom, the pocket module comprising a pair of sidewall portions located at the left side and right side respectively, a portion extending between the sidewall portions, a pusher portion extending from the back side forwardly to substantially the front side to position the grouping against the front side of the pocket module, the pusher portion having a product piece engagement portion and a spring portion whereby when the product piece engagement portion is displaceable rearwardly, a forward bias is provided to the product piece engagement portion by the spring portion, and wherein the sidewall portions, the portion extending between the sidewall portions, and the pusher portion are all formed from a single piece of plastic sheet material and wherein each portion connected to another portion is connected at a fold formed in the single piece of clear plastic sheet whereby the portions are all integral with one another.

10. The display of claim 9 wherein the module is formed of transparent plastic.

11. The display of claim 9 wherein the portion extending between the sidewalls comprises a backwall portion that is substantially planar at the back side and the spring portion is substantially planar and extends at an angle from the backwall portion.

12. The display in combination with a backwardly extending aligned grouping of a plurality of like shaped products of claim 9 further comprising a rack of horizontal supports in an upright stack and further comprising a plurality of said pocket modules, each horizontal support supporting a row of said pocket modules, each pocket module having a pocket area for storing a grouping of a plurality of like shaped products and an access and removal zone for insertion and removal of said grouping of like shaped products, and wherein each of said access and removal zones is constrained by the respective pocket module and a horizontal support.

13. The display in combination with a backwardly extending aligned grouping of a plurality of like shaped products of claim 12 wherein each horizontal support is G-shaped in the cross-section, and each of the stack of horizontal supports is engaged with an adjacent horizontal support.

14. A method of manufacturing a display for displaying and dispensing a plurality of groupings arranged in a matrix of product pieces, each grouping comprising a plurality of aligned product pieces extending rearwardly, the method comprising the steps of: shaping a plurality of planar cut out portions of rigid plastic sheet material, each cut out portion providing for a pair of sidewall portions, a portion for extending between the sidewall portions, and a pusher portion; heating and bending forming folds in each of the cut-out portions thereby forming a unitary pocket module defining an interior pocket volume and having a front side, a back side, a left side, a right side, a sidewall portion positioned at the left side, a sidewall portion positioned at the right side, a portion extending between the sidewalls, and a pusher portion extending from the back side forwardly to substantially the front side, the pusher portion retractable to the back side; the sidewall portions, the portion for extending between the sidewall portions, and the pusher portion all connected by way of the folds formed by the heating and bending, constructing a rack of horizontal supports with each horizontal support having a row of said pocket modules; arranging a plurality of said pocket module in a row on each horizontal support whereby each module is in contact with an adjacent module, and constraining access to each pocket volume of each pocket module whereby only a single product piece of a grouping can be removed at a time from the pocket volume.

15. The method of claim 14 further comprising the step of forming each horizontal support in a G-shape.

16. The method of claim 15 further comprising the step of offsetting rearwardly each horizontal support from the horizontal support immediately therebelow.

17. The method of claim 16, wherein the sheet of plastic is a sheet of PETG with a thickness in the range of 0.020 to 0.200 inches.

* * * * *